US012274900B1

(12) United States Patent
Rullo et al.

(10) Patent No.: US 12,274,900 B1
(45) Date of Patent: Apr. 15, 2025

(54) BODY BELT HAVING ADDED D-RINGS/ATTACHMENT FOR RETROFITTING EXISTING BODY BELTS

(71) Applicant: Buckingham Manufacturing Company, Inc., Binghamton, NY (US)

(72) Inventors: James J. Rullo, Binghamton, NY (US); James Pennefeather, Johnson City, NY (US)

(73) Assignee: Buckingham Manufacturing Company, Inc., Binghamton, NY (US)

( * ) Notice: Subject to any disclaimer, the term of this patent is extended or adjusted under 35 U.S.C. 154(b) by 46 days.

(21) Appl. No.: 17/160,734

(22) Filed: Jan. 28, 2021

Related U.S. Application Data

(60) Continuation of application No. 16/160,333, filed on Oct. 15, 2018, now Pat. No. 10,933,261, which is a (Continued)

(51) Int. Cl.
*A62B 35/00* (2006.01)

(52) U.S. Cl.
CPC ...... *A62B 35/0025* (2013.01); *A62B 35/0006* (2013.01); *A62B 35/0037* (2013.01)

(58) Field of Classification Search
CPC .............. A62B 35/0025; A62B 35/006; A62B 35/0037; A62B 35/0031; A63B 21/4009; A63B 27/00
See application file for complete search history.

(56) References Cited

U.S. PATENT DOCUMENTS 1,903,081 A * 3/1933 Wotherspoon .......... A41F 9/002 D29/101.1
2,127,034 A * 8/1938 Kabat ..................... A41F 9/002 224/904

(Continued)

FOREIGN PATENT DOCUMENTS

FR 759149 A * 1/1934
FR 1193673 A * 11/1959
FR 2606650 A1 * 5/1988

*Primary Examiner* — Colleen M Chavchavadze
(74) *Attorney, Agent, or Firm* — Bond, Schoeneck & King, PLLC; Frederick J. M. Price

(57) ABSTRACT

A body belt for use by linemen and others engaged in operations on poles or similar structures having a secondary set of D-rings, typically disposed slightly rearward of the primary D-rings on the belt or an auxiliary belt or attachment above or below the primary D-ring of the belt. The secondary D-rings which may differ in size from the primary D-rings, allow a wearer to separate devices that are normally attached to the primary D-rings. This allows less crowding of the primary D-rings, thereby making detachment and reattachment of one or more ancillary safety devices from the body belt as a lineman encounters an obstacle during his or her work on a pole or other elevated structure, thereby improving safety. An add-on D-ring assembly is provided for retrofitting body belts of the prior art. In another embodiment of the invention, an auxiliary body belt is detachably connected to the primary body belt, the auxiliary body belt having its own set of D-rings. Rather than providing all four D-rings in a common plane, as described above, this embodiment provides one plane for the first set of D-rings (on the primary body belt) and a second, parallel plane for the second set of D-rings (on the auxiliary body belt).

26 Claims, 14 Drawing Sheets

Related U.S. Application Data continuation of application No. 15/625,034, filed on Jun. 16, 2017, now Pat. No. 10,099,073, which is a continuation of application No. 14/587,722, filed on Dec. 31, 2014, now Pat. No. 9,737,737, which is a division of application No. 12/880,592, filed on Sep. 13, 2010, now abandoned, which is a continuation-in-part of application No. 12/288,732, filed on Oct. 23, 2008, now abandoned.

(56) References Cited

U.S. PATENT DOCUMENTS

| | | | | | |
|---|---|---|---|---|---|
| 2,149,803 | A * | 3/1939 | Wight | A62B 35/00 | 224/259 |
| 2,152,049 | A * | 3/1939 | Hedrick | A62B 35/00 | 182/9 |
| 2,661,888 | A * | 12/1953 | Sidlinger | A62B 35/0031 | D30/152 |
| 2,833,454 | A * | 5/1958 | McGee | A62B 35/0031 | 182/3 |
| 2,834,525 | A * | 5/1958 | Shawgo | F16P 1/00 | 182/9 |
| 5,067,585 | A * | 11/1991 | Bell | A62B 35/0012 | 182/7 |
| 5,360,384 | A * | 11/1994 | Toensing | A63B 21/4009 | 482/43 |
| 6,374,945 | B1 * | 4/2002 | Sherwood | A62B 35/0037 | 182/36 |
| 7,707,652 | B2 * | 5/2010 | Senegal | A63B 23/047 | 2/102 |
| 7,854,694 | B1 * | 12/2010 | Frunzi | A63B 23/12 | 482/121 |
| 10,369,390 | B2 * | 8/2019 | Levy | A62B 35/0025 | |

* cited by examiner

BODY BELT HAVING ADDED D-RINGS/ATTACHMENT FOR RETROFITTING EXISTING BODY BELTS

REFERENCE TO RELATED APPLICATION

The present application is a continuation of U.S. patent application Ser. No. 16/160,333 filed on Oct. 15, 2018, which is a continuation of U.S. patent application Ser. No. 15/625,034, filed on Jun. 16, 2017, now U.S. Pat. No. 10,099,073, which is a continuation of U.S. patent application Ser. No. 14/587,722, filed on Dec. 31, 2014, now U.S. Pat. No. 9,737,737, and entitled Body Belt Having Added D-Rings/Attachment for Retrofitting Existing Body Belts, which is a divisional application of U.S. patent application Ser. No. 12/880,592, filed on Sep. 13, 2010, and entitled Body Belt Having Added D-Rings/Attachment for Retrofitting Existing Body Belts, which is a continuation-in-part application of U.S. patent application Ser. No. 12/288,732, filed on Oct. 23, 2008, and entitled Body Belt Having Added D-Rings/Attachment and an Attachable D-Ring for Retrofitting Existing Body Belts, the disclosures of each are incorporated herein by reference in their respective entireties.

BACKGROUND

1. Field of Invention

The invention pertains to work positioning devices for linemen and the like and, more particularly, to a body belt having more than two D-rings/attachments to improve the versatility and usability of the body belt.

2. Background of Art

In the electrical power distribution, telecommunications, and other similar industries, linemen are called upon to install and service apparatus and wiring disposed upon poles and other elevated structures. This generally requires that a linemen climb a pole and secure himself or herself in a safe, comfortable position to allow use of both hands to perform the required task atop the pole.

A fundamental item of work positioning equipment for use by linemen and others engaged in aerial tasks is known as a body belt. Body belts for use by lineman and other persons needing to work in elevated locations are well known and widely used. Such body belts are sized and configured to snugly encircle the hips of a lineman. As used herein, the term lineman and its plural, linemen, are intended to encompass any person or persons needing to securely work in an elevated location such as atop a pole.

Body belts of the prior art typically include a pair of D-rings or similar attachment points. As used herein, the term D-ring is intended to include any and all possible shapes and sizes of attachment rings or similar devices suitable for use on a body belt. The belts are provided in a variety of sizes to fit linemen having varying waist measurements. When properly sized, the back bar of the work positioning D-rings of the body belt are located at the prominent part of one hipbone to the same point on the other hipbone. This position is believed to result in maximal convenience and safety.

The usefulness and effectivity of any safety equipment depends greatly upon the willingness of the lineman to properly utilize the equipment. Equipment that is difficult to use or encumbers the lineman in performing his or her job aloft may be defeated, bypassed, or otherwise compromised. It is important, therefore, that any safety equipment be comfortable, be easy to install and remove, and be as unobtrusive as possible to linemen in performing their job.

The D-rings of the body belt form attachment points for a positioning strap. These products support a lineman working aloft and provide the user the ability to work and have free use of both hands. An ever-increasing emphasis on safety has prompted the development and deployment of a vast array or ancillary safety devices such as torso harnesses, fall positioning straps, wood pole fall protection devices, etc. Each of the ancillary devices is typically attached to the D-rings of the body belt. However, the use of some ancillary safety equipment requires detaching and reattaching at least one end of the safety device from the D-ring.

Typically, when the lineman encounters an obstacle which he/she must traverse, certain safety equipment must be detached and then reattached once the lineman has passed the obstacle. The time period during which one or more ancillary safety devices are detached is typically more dangerous for the lineman. Also, the crowding of the D-rings of a body belt of the prior art, because of the possible numerous safety devices or other items attached thereto, also increases the risk that the lineman may inadvertently detach the wrong snap hook from the D-ring, thereby exposing himself/herself to danger 20 of falling. The increased amount of concentration required to sort out numerous devices from a crowded D-ring also increases the risk of an accident.

It would therefore be desirable to provide a body belt having additional D-rings/attachments to alleviate crowding of the primary work positioning D-rings, and allow attaching ancillary safety equipment and simplify the functions required by a lineman atop a pole or other structure.

3. Discussion of the Related Art

U.S. Pat. No. 6,752,242 for WOOD POLE FALL PROTECTION DEVICE, issued Jan. 22, 2004, to Robert Whitehead et al. discloses a typical item of ancillary lineman's safety equipment requiring attachment to the D-rings of a body belt.

U.S. Pat. No. 6,962,232 for TORSO HARNESS, issued Nov. 8, 2005, to Frederick J. Diggle discloses a torso harness attached to a typical body belt of the prior art.

Neither of the patents, taken alone or in combination, is seen to teach or suggest the novel body belt of the present invention.

SUMMARY OF THE INVENTION

In accordance with the present Invention there is provided an improved body belt for use by linemen and others engaged in aerial operations on poles or similar structures. A primary pair of D-rings is provided with an integral attachment above or below the primary attachment disposed along and fixedly attached to the 'D' piece at positions approximately coincident to a midpoint of a right side and a left side, respectively, of a torso of a wearer of the body belt. A secondary set of D-rings may be provided in lieu of or in addition to the primary D-rings, typically disposed slightly rearward of the primary D-rings and rigidly affixed to the belt. The secondary D-rings may be flat or slightly angled outward with reference to a line tangential to the surface of the web of the belt, typically approximately 30°. The secondary D-rings, may differ in size from the primary D-rings. The additional D-rings/attachments allow a wearer to separate devices that are normally attached to the primary D-rings. Also, the secondary D-rings may be offset from a line tangential to the surface of the body belt strap/D-Piece by an acute angle, typically about 30°. The integral attachment to the primary D-rings as well as the secondary D-rings may be located above or below the primary D-rings. This allows less crowding of the primary D-rings, thereby making detachment and reattachment of one or more ancillary safety devices from the body belt as a lineman 20 encounters an obstacle during his or her work on a pole or other elevated structure. This improves safety by requiring less effort by the lineman to locate and detach the correct safety device from the body belt. For example, safety devices that should never be detached from the body belt may always be attached to the primary D-ring.

In another embodiment of the invention, an auxiliary body belt is detachably connected to the primary body belt, the auxiliary body belt having its own set of D-rings. Rather than providing all four D-rings in a common plane, as described above, this embodiment provides one plane for the first set of D-rings (on the primary body belt) and a second, parallel plane for the second set of D-rings (on the auxiliary body belt). The D-rings of the auxiliary body belt may differ in size from the primary body belt D-rings. Moreover, the D-rings of the primary body belt need not be aligned with the D-rings of the auxiliary body belt.

In addition to an improved body belt having an integral attachment to the primary D-rings or a secondary set of D-rings, an add-on D-ring assembly is provided for retrofitting body belts of the prior art.

It is therefore an object of the invention to provide a body belt having an added set of D-rings/attachments disposed thereupon.

It is another object of the invention to provide a body belt having an added set of D-rings/attachments wherein the secondary D-rings are disposed rearward from the primary set of D-rings and may be in the same line, above or below the primary set of 20 D-rings.

It is an additional object of the invention to provide a body belt having an added set of D-rings wherein the secondary D-rings maybe of a size different from the primary D-rings.

It is a further object of the invention to provide a body belt having an added set of attachment points wherein primary D-rings include an integral attachment above or below the primary attachment.

It is a further object of the invention to provide an attachable D-ring assembly adapted for attachment to an existing body belt.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE EMBODIMENT

The present Invention provides an improved body belt for use by linemen and others engaged on poles or other elevated structures. The body belt in accordance with the present invention features an added, secondary set of D-rings/attachment points to improve functionality of the body belt and improve the safety of a user thereof.

Figure 1:
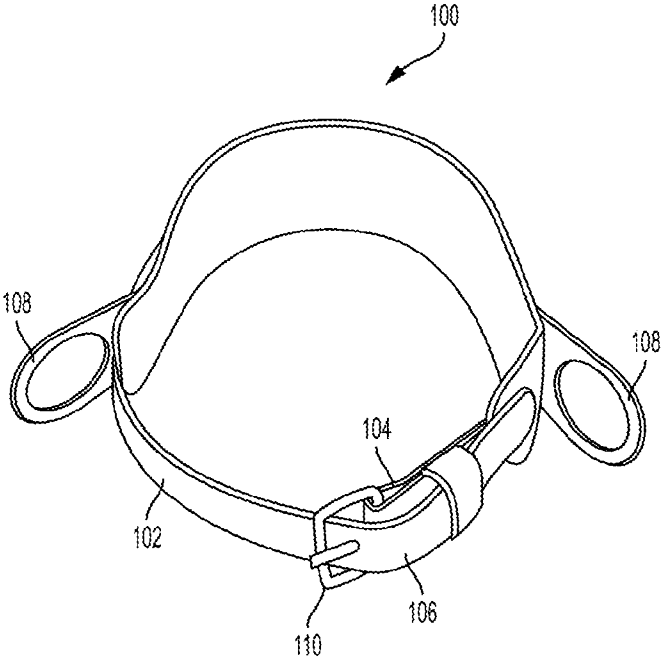
FIG. 1 PRIOR ART
FIG. 1 is a perspective view of a typical body belt of the prior art.

Referring first to FIG. 1, there is shown a perspective view of a body belt of the prior art, generally at reference number 100. Body belt 100 is designed to encircle the torso of the human at a point slightly above the wearer's hips, not shown. Body belt 100 has a belt strap 102 having a proximal end 106 and a distal end 104 terminating in a buckle 110. A pair of D-rings 108 is disposed on belt strap 102 of body belt 100 in positions to be substantially adjacent the midpoint of the wearer's right and left hips.

Figure 2:
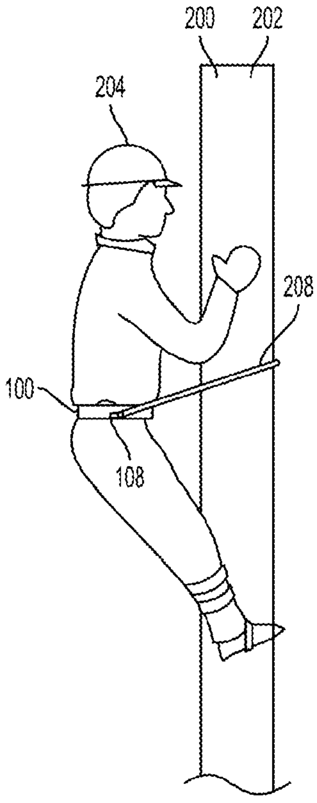
FIG. 2 PRIOR ART
FIG. 2 is a schematic view of a lineman wearing the body belt of FIG. 1 and being deployed on a pole.

Referring now to FIG. 2, there is a simplified schematic view 200 of a lineman 204 on a pole 202. Lineman 204 is wearing prior art body belt 100. Attached to D-rings 108 of body belt 100 is a positioning strap 208.

Figure 3:
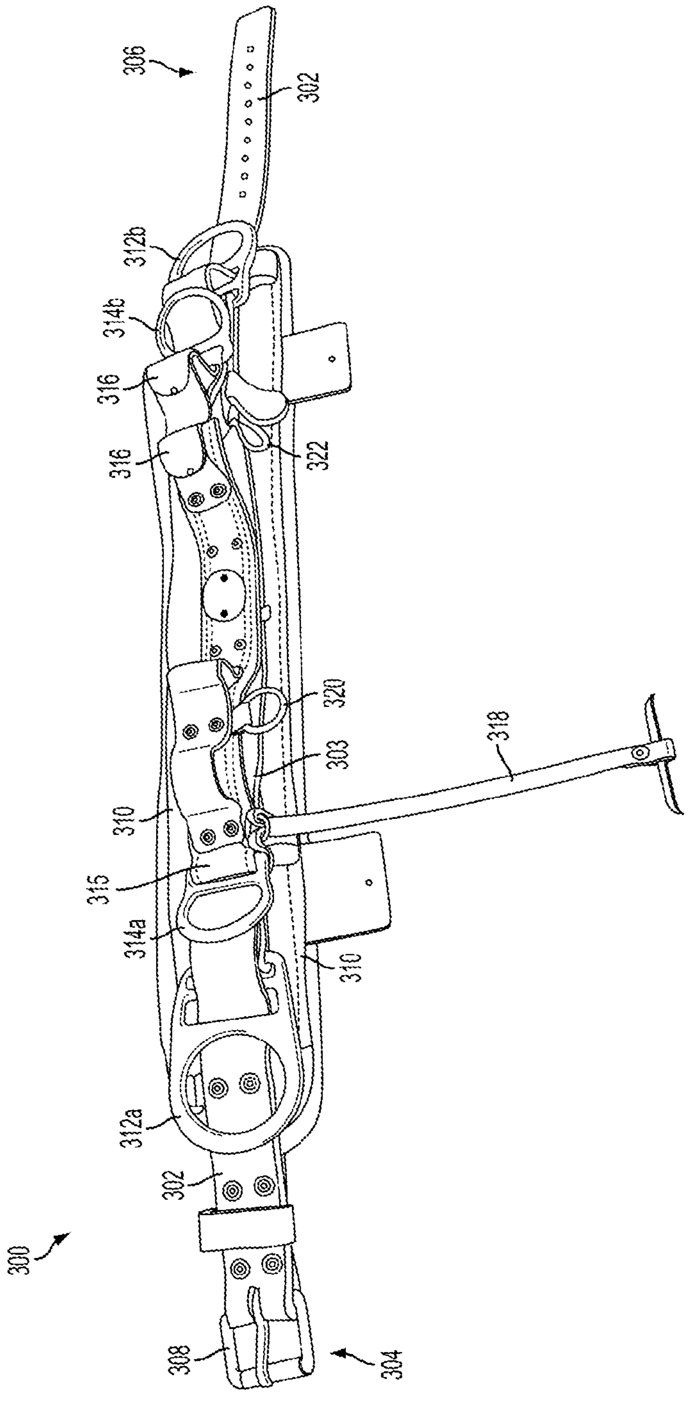
FIG. 3 is a pictorial, front perspective view of a body belt in accordance with the invention.
Figure 4:
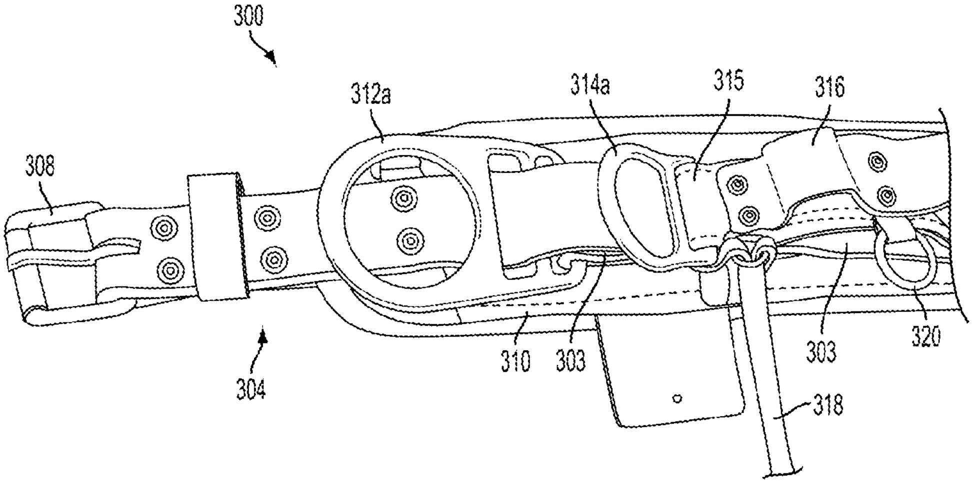
FIG. 4 is an enlarged view of an end portion of the body belt of FIG. 3.
Figure 5:
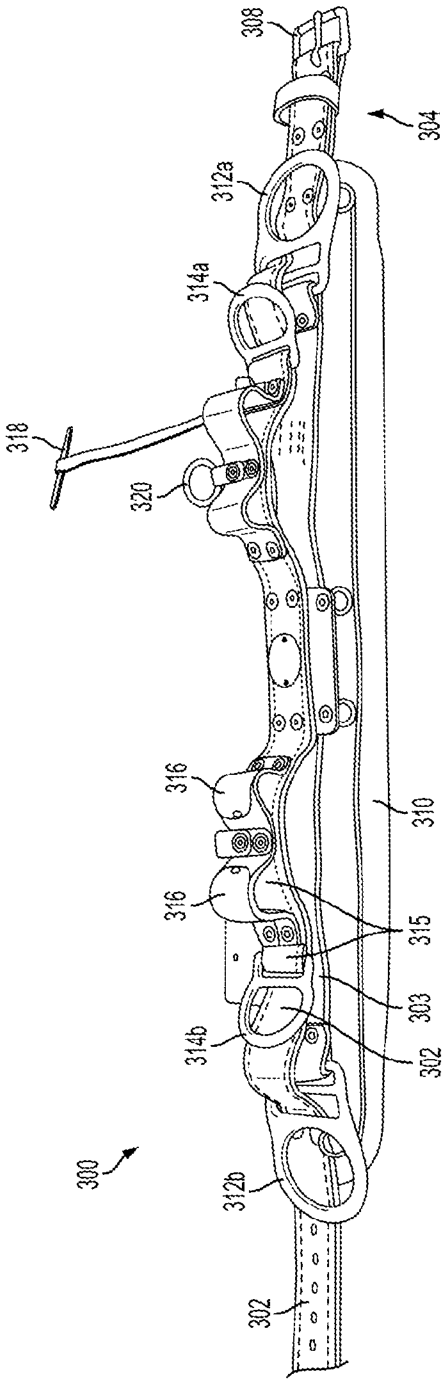
FIG. 5 is a pictorial, top perspective of the body belt of FIG. 3.

Referring now to FIGS. 3, 4, and 5, there are shown an overall pictorial 20 perspective view, a partial, detailed, pictorial, perspective view, and a top perspective view, respectively, of a body belt in accordance with the present invention, generally at reference number 300. Body belt 300 has a belt strap 302 having a proximal end 306 and a distal end 304. A buckle 308 is securely fastened to belt strap 302 at distal end 304.

Body padding 310 is affixed to an inside surface (i.e., the surface against a wearer's back, not shown, when the belt 300 is in use) of belt strap 302. Padding 310 forms no part of the present invention and is not further described herein.

A distal, primary D-ring 312*a* is affixed to belt 'D' piece 303 in a position coincident with a midpoint of the left side of a wearer hip when the body belt 300 is properly fitted to a wearer, not shown. Likewise, body belt 300 has a proximal, primary D-ring 312*b* affixed to belt 'D' piece 303 at a position coincident with a midpoint of the right hip of a wearer of body belt 300 when properly fitted to the wearer.

A secondary, distal D-ring 314*a* is disposed rearward of primary, distal D-ring 312*a*. Likewise, a secondary, proximal D-ring 314*b* is disposed rearward of primary proximal D-ring 312*b*. Secondary D-rings 314*a* and 314*b* are attached to a belt "d" piece 315 (see FIGS. 3 and 4). The term rearward is used with reference to the body of a wearer, not shown, when body belt 300 is properly positioned thereupon.

In the embodiment chosen for purposes of disclosure, secondary D-rings 314*a*, 314*b* are shown smaller than primary D-rings 312*a*, 312*b*. It will be recognized that in alternate embodiments of the inventive body belt 300, secondary D-rings 314*a*, 314*b* could be of an equal or a larger size than primary D-rings 312*a*, 312*b*. Consequently, 20 the invention is not limited to any particular size relationship between primary D-rings 312*a*, 312*b* and secondary D-rings 314*a*, 314*b*. Rather, the invention includes any size relationship between primary D-rings 312*a*, 312*b* and secondary D-rings 314*a*, 314*b*.

Secondary D-rings 314*a*, 314*b* may be flat or angled slightly outward, as shown, typically at an approximately 30° angle. The angle facilitates grasping the secondary D-rings 314*a*, 314*b* by the wearer of body belt 300 as secondary D-rings 314*a*, 314*b* may be out of sight of the wearer. In addition, secondary D-rings 314*a*, 314*b* may be in line with, above or below primary D-rings 312*a*, 312*b*.

Other ancillary pockets, rings and attachment points, for example tool loops 316, tape thong 318, accessory ring 320, and accessory snap 322, are shown attached to belt strap 302 of body belt 300. As none of these structures or features forms any part of the present invention, they are not further described herein.

Body belt 300 provides significantly improved functionality and resultant safety. A user, not shown, can spread the attachments (e.g., snap hooks) for ancillary safety equipment, not shown, between primary D-rings 312*a*, 312*b*, and secondary D-rings 314*a*, 314*b*. It will be recognized by those of skill in the art that numerous strategies can be used for deciding what ancillary equipment is attached to which D-ring. Regardless of a chosen strategy, a wearer has fewer devices attached to any given D-ring 312*a*, 312*b*, 314*a*, 314*b* when using the novel body belt 300. This naturally results in easier detachment and reattachment of any safety devices that must be detached when, for 20 example, an obstacle is encountered. The advantages of the novel body belt 300 have motivated the inventor thereof to provide an auxiliary D-ring assembly that may be retrofitted to a body belt 100 (FIG. 1) of the prior art.

Figure 6:
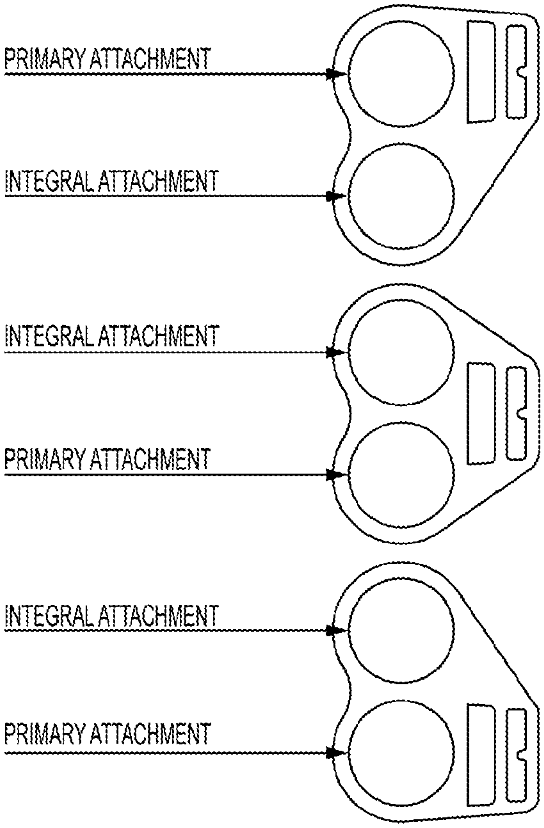
FIG. 6 is a side view of the primary D-ring when it includes an integral attachment, either above or below primary D-ring attachment.
Figure 6A:
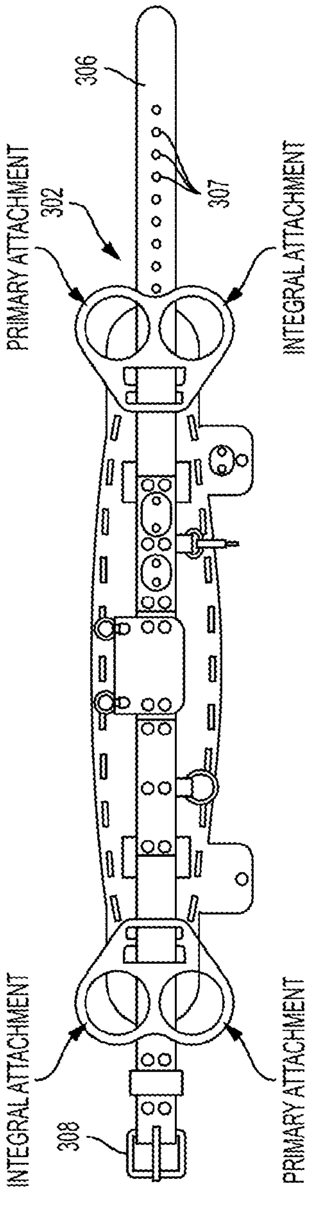
FIG. 6A is a pictorial, front perspective view of a body belt in accordance with the invention.
Figure 7:
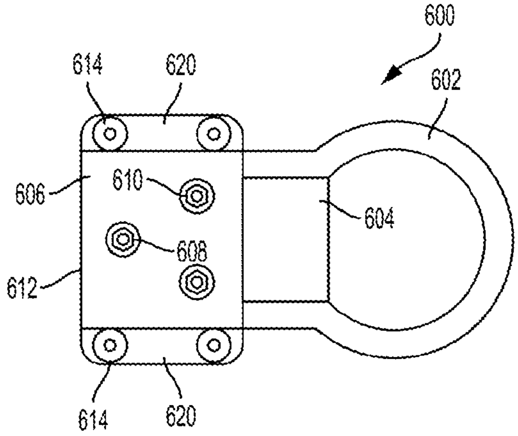
FIG. 7 is a top plan view of an auxiliary D-ring assembly for attaching to a body belt of the prior art to practice the present invention.
Figure 8:
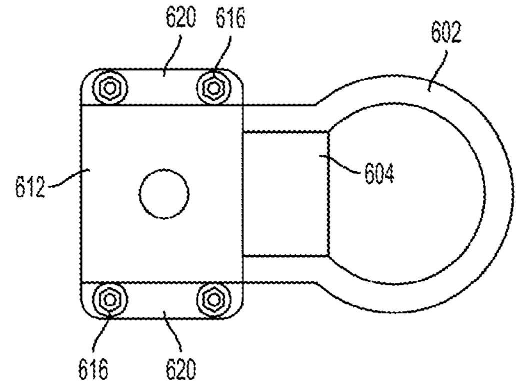
FIG. 8 is a bottom plan view of the buckle assembly of FIG. 7.
Figure 9:
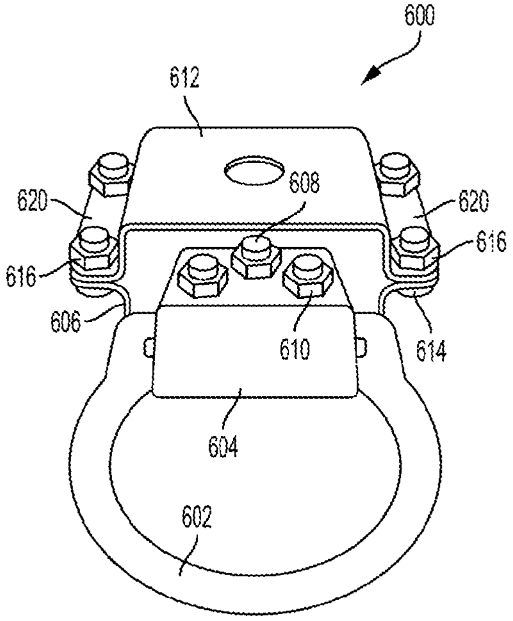
FIG. 9 is a right end elevational view of the buckle assembly of FIG. 7.
Figure 10:
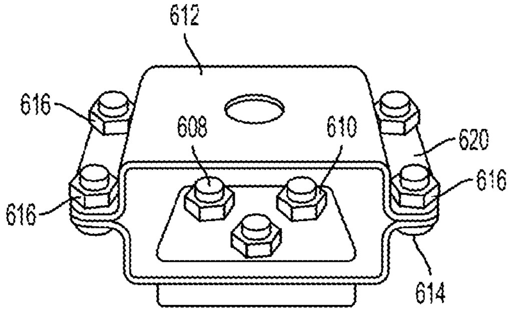
FIG. 10 is a left end elevational view of the buckle assembly of FIG. 7.

Referring now to FIG. 6, there is shown a side plan elevational view, of a D-ring assembly having an additional top attachment for use with a body belt 100 (FIG. 1) of the prior art. Additional attachment may be included at the bottom of the primary D-ring, as opposed to the top (FIG. 6A).

Referring now to FIGS. 7, 8, 9, 10, and 11, there are shown top plan, bottom plan, right end elevational and two left end elevational views, respectively, of a D-ring assembly adapted for addition to a body belt 100 (FIG. 1) of the prior art. The novel D-ring assemblies 600 allow retrofitting such prior art body belts 100 to include secondary D-rings (FIGS. 3, 4 and 5), thereby improving the safety and ease of use of the body belt 100.

A D-ring 602 is captured in a clip 604 that is fastened to a top or outer plate 606 by bolts 608 and nuts 610. While bolts 608 and nuts 610 have been chosen for purposes of disclosure, it will be recognized by those skilled in the art that other fastener components may be substituted therefor. Consequently, the invention is not considered limited to the particular fastener type chosen. D-ring 602 is rigidly fastened in clip 604.

Top plate 606 and a corresponding bottom or inner plate 612 each have flange 20 regions 620 adapted to abut one another when top plate 606 meets bottom plate 612. Flange regions 620 each have pairs of through-holes, not shown, adapted to allow passage of cap screws 614 or similar threaded fasteners.

Cap screws 614, acting cooperatively with nuts 616, secure flange regions 620 of upper plate 606 to corresponding flange regions 620 of lower plate 612.

Upper plate 606, when connected to lower plate 612, defines a substantially rectangular inner region 622 adapted to receive the belt strap 102 (FIG. 1) of a body belt 100 therein. The design and dimensions of upper plate 606 and lower plate 612 are selected so that when belt strap 102 is placed in rectangular inner region 622, D-ring assembly 600 may be securely affixed thereto. One or more pads 224, best seen in FIG. 11, help compensate for differences in the thickness of belt strap 102.

While 'U' shaped top plate 606, 'U' shaped bottom plate 612, cap screws 614 and nuts 616 have been chosen for purposes of disclosure, it will be recognized by those of skill in the art that other top and bottom plates shapes and fastener components may be substituted therefor. Consequently, the invention is not considered limited to the particular plate shape and fastener type chosen to secure upper plate 606 and lower plate 612.

Figure 11:
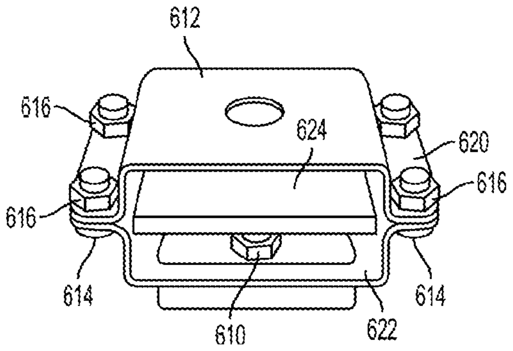
FIG. 11 is a left end elevational view of the buckle assembly of FIG. 10 with a pad inserted therein.

As shown in FIG. 11, one or more pads 624 are typically placed within cavity 622 over the top of nuts 610 to protect the surface of the belt strap or a body belt, not 20 shown, to which the buckle assembly 600 is to be attached. Depending on the thickness of the belt strap, multiple pads 624 may be required to securely affix buckle assembly 600 to the belt strap.

In operation, cap screws 614 are separated from nuts 616 and U-shape upper plate 606 is at least partially separated from lower plate 612. One or more pads 624 are placed into the recess created by the upper plate 606 and lower plate 612. Web 102 is then placed into the recess and over one or more pads 624. D-ring assembly 600 is reassembled and as cap screws 614 and nuts 616 are reassembled and tightened, belt strap 102 in securely retained within inner region 622.

Figure 12:
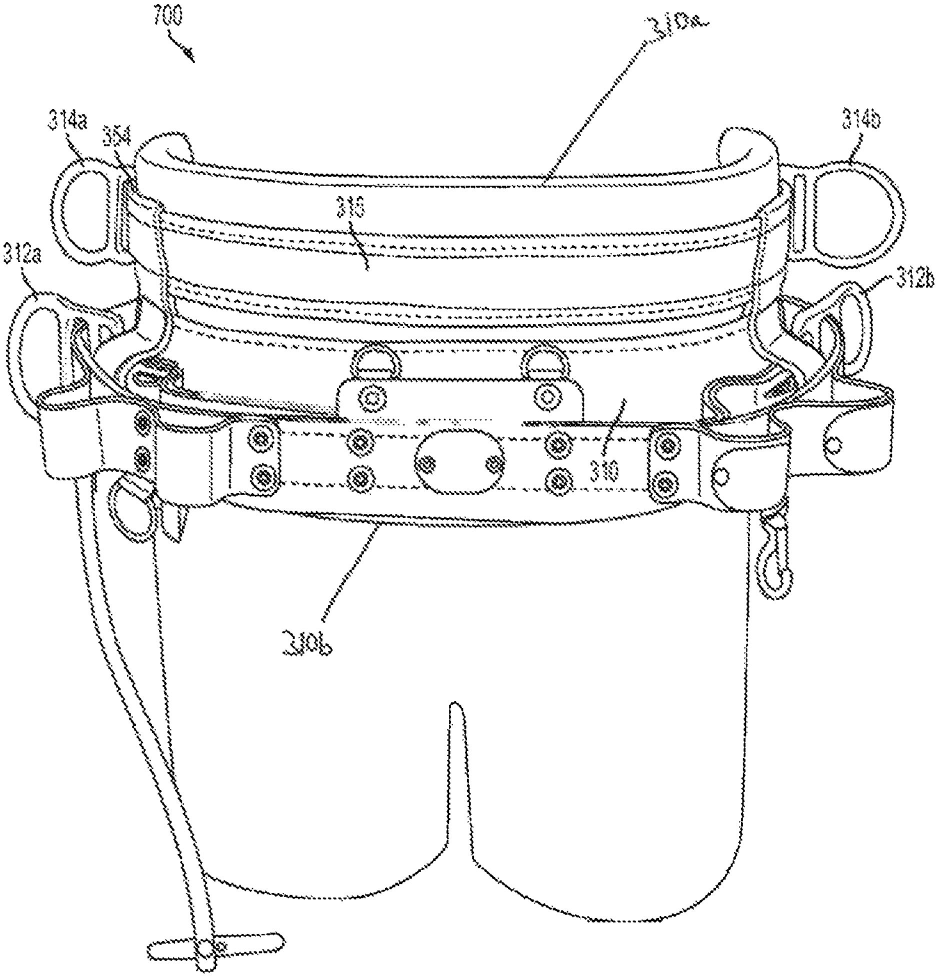
FIG. 12 is a pictorial, front perspective view of a primary body belt and an auxiliary body belt having a second set of D-rings, in accordance with another embodiment of the invention.

Referring now to FIG. 12, an alternate embodiment of the multiple D-ring assembly of the invention is shown at reference numeral 700. A primary body belt 310 has D-rings 312*a*, 312*b* as described hereinabove. Attached to primary body belt 310 are two vertical, connector straps 354, respectively. Connector straps 354 are stitched, as shown, to the main portion of primary body belt 310. Although two vertical connector straps 354 are shown, it should be understood that a greater number of such connector straps as well as attachment methods can also be used without departing from the scope of the invention.

Vertical connector straps 354 extend upwardly to respective positions on an auxiliary body belt 315. Connected to auxiliary body belt 315 are auxiliary D-rings 314*a* and 314*b*, providing the third and fourth D-rings in accordance with the invention. The auxiliary body belt 315 may be detachably connected to the primary body belt 310.

Auxiliary body belt 315, having its own set of D-rings 314*a*, 314*b*, rather than providing all four D-rings in a common plane, as described with respect to the belt shown in FIGS. 3-5, provides one plane for the first set of D-rings 312*a*, 312*b* (on the primary body belt 310) and a second, parallel plane for the second set of D-rings 314*a*, 314*b* (on the auxiliary body belt 315). The size of primary body belt D-rings 312*a*, 312*b* is not necessarily the same as the size of auxiliary body belt D-rings 314*a*, 314*b*. Nor does the primary set of D-rings 312*a*, 312*b* have to be aligned with the auxiliary set of D-rings 314*a*, 314*b*.

Figure 13:
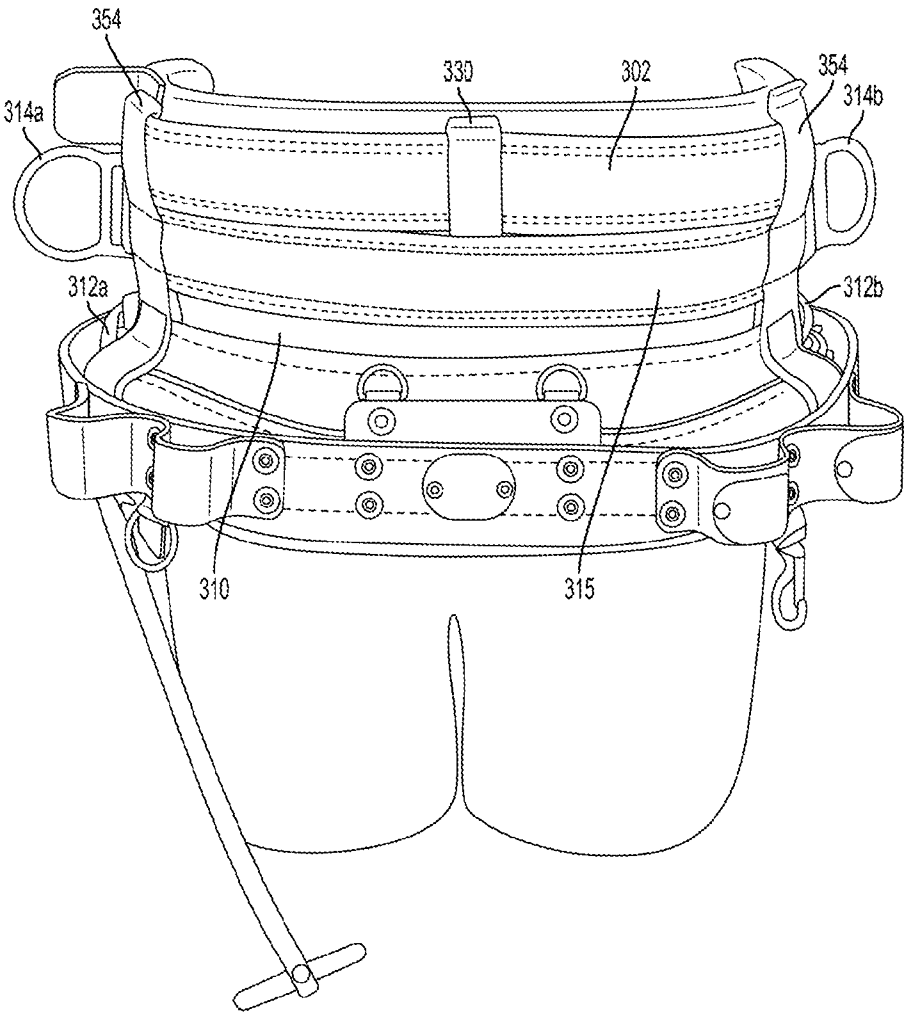
FIG. 13 is a pictorial, front perspective view of an alternate primary and auxiliary body belts similar to FIG. 12.

Referring now to FIG. 13, there is shown a pictorial view of a primary and auxiliary body belt assembly, similar to that shown in FIG. 12, above. In this embodiment, a second auxiliary body belt 302 is disposed above the auxiliary body belt 315. Retaining second auxiliary body belt 302 is a vertical strap 330. Second auxiliary body belt 302 is connected via vertical connector straps 354 to primary body belt 310. Primary body belt D-rings 312*a*, 312*b* may thus be connected to either auxiliary body belt 315, second auxiliary body belt 302, or both, as is well known in the art.

Vertical connector straps 354 continue to extend downwardly, as described hereinabove, to respective positions on primary body belt 310. Once again, connected to primary body belt 310 are primary body belt D-rings 312*a* and 312*b*.

Figure 14:
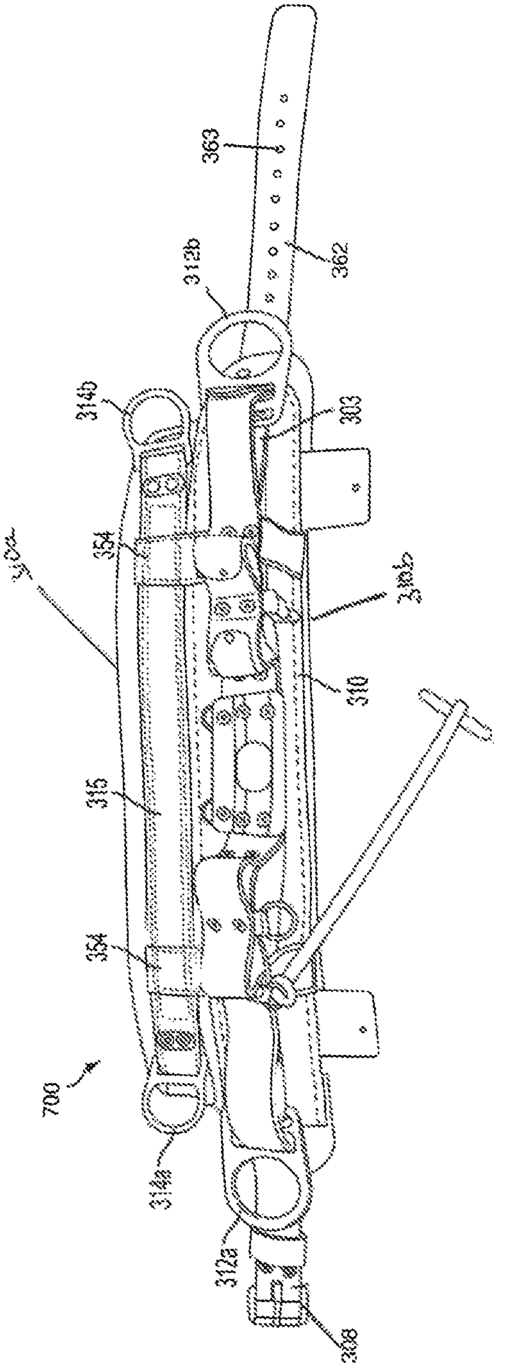
FIG. 14 is a pictorial, front perspective view of a primary body belt and a streamlined, auxiliary body belt having a second set of D-rings, in accordance with still another embodiment of the invention.

Referring now to FIG. 14, a streamlined primary/auxiliary body belt combination 800 is shown. Primary body belt 310 has two D-rings 312*a*, 312*b* attached thereto. Vertical connector straps 354 are attached to primary body belt 310 in a manner well known to those skilled in the art. Vertical connector straps 354 extend upwardly to respective positions on an auxiliary body belt 315. Connected to auxiliary body belt 315 are auxiliary D-rings 314*a*, 314*b*, providing the third and fourth D-rings in accordance with the invention. The auxiliary body belt 315 may be detachably connected to the primary body belt 310, the auxiliary body belt 315 having its own set of D-rings 314*a*, 314*b*, rather than providing all four D-rings in a common plane, as described with respect to the belt shown in FIGS. 3-5. One plane encompasses the first set of D-rings 312*a*, 312*b* (on the primary body belt 310) and a second, parallel plane is for the second set of D-rings 314*a*, 314*b* (on the auxiliary body belt 315). Once again, the size of primary body belt D-rings 312*a*, 312*b* is not necessarily the same as the size of auxiliary body belt D-rings 314*a*, 314*b*. The primary set of D-rings 312*a*, 312*b* need not be aligned with the auxiliary set of D-rings 314*a*, 314*b*.

Figure 15:
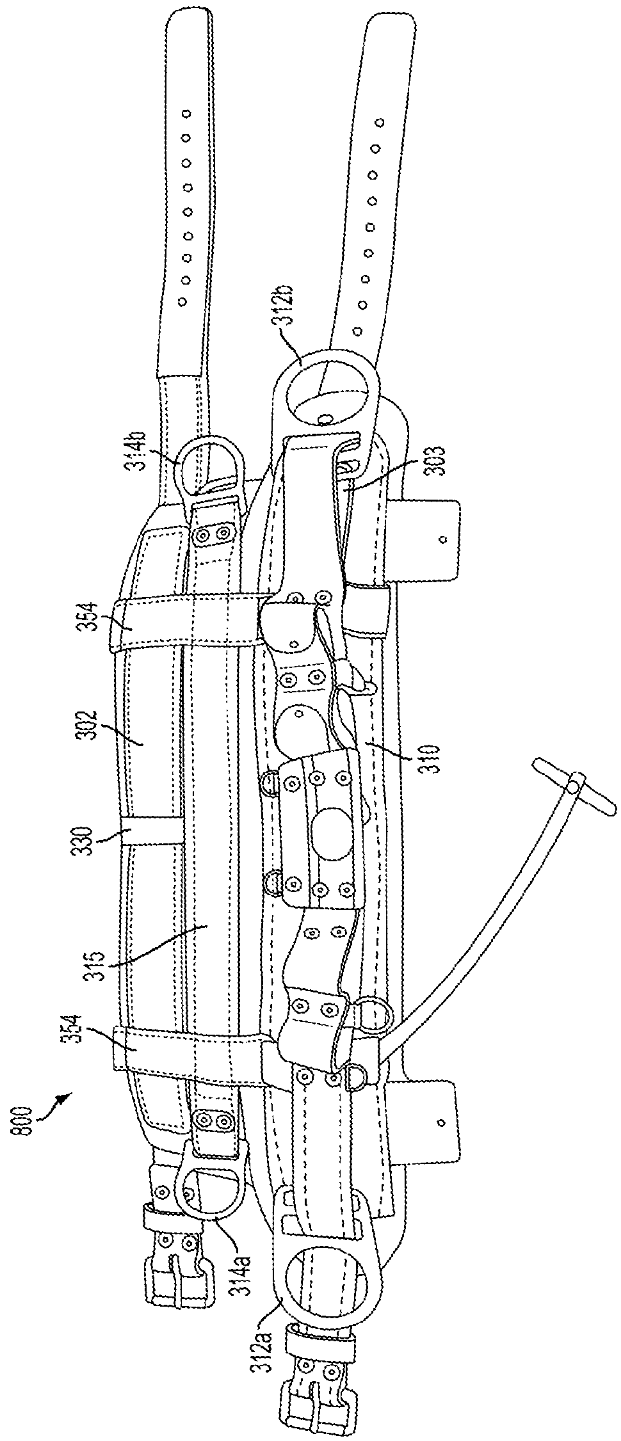
FIG. 15 is a pictorial, front perspective view of an alternate primary and auxiliary body belts similar to FIG. 14.

Referring now to FIG. 15, there is shown a pictorial view of a primary and auxiliary body belt assembly 800', similar to that shown in FIG. 14, above. In this embodiment, a second auxiliary body belt 302 is disposed above the auxiliary body belt 315. Retaining second auxiliary body belt 302 are vertical straps 354. Second auxiliary body belt 302 is connected via vertical connector straps 354 to primary body belt 310. Auxiliary body belt D-rings 314*a*, 314*b* may thus be connected to either auxiliary body belt 315, second auxiliary body belt 302, or both, as is well known in the art. Secondary auxiliary belt 302 is constrained by a vertical strap 330 as shown.

Vertical connector straps 354 continue to extend downwardly from auxiliary body belt 315 and second auxiliary body belt 302, as described hereinabove, to respective positions on auxiliary body belt 315. Once again, connected to primary body belt 310 are auxiliary D-rings 314*a*, 314*b*, providing the third and fourth D-rings in accordance with the invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A body belt assembly for securing a lineman to a pole when in use, the body belt assembly comprising:

a body pad comprising a surface extending between a first perimeter and a second perimeter;

a primary D-piece having a proximal end and a distal end and a first surface and a second surface, wherein the first surface of the primary D-piece faces the surface of the body pad and the second surface of the primary D-piece, opposite the first surface, faces away from the surface of the body pad and wherein the primary D-piece is connected to the surface of the body pad;

a belt strap connected to the surface of the body pad and extending between a first end and a second end, wherein the belt strap is positioned in-line with the primary D-piece and further comprises a first surface that faces the second surface of the primary D-piece and a second surface opposite the first surface that faces away from the second surface of the primary D-piece;

a first primary D-ring positioned at the first end of the primary D-piece and a second primary D-ring positioned at the second end of the primary D-piece;

an auxiliary D-piece positioned in-line with the primary D-piece and having a first surface and a second surface, wherein the first surface of the auxiliary D-piece faces the second surface of the belt strap and the second surface of the auxiliary D-piece is opposite the first surface of the auxiliary D-piece and wherein the auxiliary D-piece is connected to the surface of the body pad and extends between a first end and a second end; and a first secondary D-ring positioned at the first end of the auxiliary D-piece and a second secondary D-ring positioned at the second end of the auxiliary D-piece.

2. The body belt assembly of claim 1, wherein the belt strap does not extend beyond the first perimeter or the second perimeter of the body pad.

3. The body belt assembly of claim 2, wherein the first perimeter at least partially extends along a first axis and the bottom perimeter at least partially extends along a second axis, wherein the second axis is parallel to and offset from the first axis.

4. The body belt assembly of claim 1, wherein each of the first primary D-ring and the second primary D-ring are fixedly attached to the primary D-piece such that the first primary D-ring and the second primary D-ring are located substantially equidistant from a center location on the body pad.

5. The body belt assembly of claim 1, wherein each of the first secondary D-ring and the second secondary D-ring are fixedly attached to the auxiliary D-piece such that the first secondary D-ring and the second secondary D-ring are substantially equidistant from a center location on the body pad.

6. The body belt assembly of claim 1, wherein the belt strap extends through the first and second primary D-Rings.

7. The body belt assembly of claim 1, wherein the belt strap is positioned further away from the body pad than the primary D-piece.

8. The body belt assembly of claim 1, wherein the auxiliary D-piece is positioned further away from the body pad than the belt strap.

9. The body belt assembly of claim 1, wherein the first and second primary D-rings are positioned further from a center location on the body pad than the first and second secondary D-rings.

10. The body belt assembly of claim 1, wherein the first and second primary D-rings are larger than the first and second secondary D-rings.

11. The body belt assembly of claim 1, wherein the first and second primary D-rings are smaller than the first and second secondary D-rings.

12. The body belt assembly of claim 1, further comprising a buckle disposed proximate one of the proximate end and the distal end of the belt strap.

13. The body belt assembly of claim 12, further comprising holes for engaging the buckle disposed at an opposite one of the proximal end and the distal end from the buckle.

14. A body belt assembly for securing a lineman to a pole when in use, the body belt assembly comprising:

a body pad comprising a surface extending between a first perimeter and a second perimeter;

a belt strap having a proximal end and a distal end and a first surface and a second surface, wherein the first surface of the belt strap faces the surface of the body pad and the second surface of the belt strap, opposite the first surface, faces away from the body pad and wherein the belt strap is connected to the surface of the body pad;

a primary D-piece connected to the surface of the body pad and extending between a first end and a second end, wherein the primary D-piece is positioned in-line with the belt strap and further comprises a first surface that faces the second surface of the belt strap and a second surface opposite the first surface and faces away from the second surface of the belt strap;

a first primary D-ring positioned at the first end of the primary D-piece and a second primary D-ring positioned at the second end of the primary D-piece, wherein the first primary D-ring is positioned and securely fixed to the first end of the primary D-piece and the second primary D-ring is positioned and securely fixed to the second end of the primary D-piece;

an auxiliary D-piece positioned in-line with the primary D-piece and having a first surface and a second surface, wherein the first surface of the auxiliary D-piece faces the second surface of the belt strap and the second surface of the auxiliary D-piece is opposite the first surface of the auxiliary D-piece, and wherein the auxiliary D-piece is connected to the surface of the body pad and extends between a first end and a second end; and a first secondary D-ring positioned at the first end of the auxiliary D-piece and a second secondary D-ring positioned at the second end of the auxiliary D-piece.

15. The body belt assembly of claim 14, wherein the belt strap does not extend beyond the first perimeter or the second perimeter of the body pad.

16. The body belt assembly of claim 15, wherein the first perimeter at least partially extends along a first axis and the bottom perimeter at least partially extends along a second axis, wherein the second axis is parallel to and offset from the first axis.

17. The body belt assembly of claim 14, wherein each of the first primary D-ring and the second primary D-ring are fixedly attached to the primary D-piece such that the first primary D-ring and the second primary D-ring are located substantially equidistant from a center location on the body pad.

18. The body belt assembly of claim 14, wherein each of the first secondary D-ring and the second secondary D-ring are fixedly attached to the auxiliary D-piece such that the first secondary D-ring and the second secondary D-ring are substantially equidistant from a center location on the body pad.

19. The body belt assembly of claim 14, wherein the belt strap A extends through the first and secondary D-Rings.

20. The body belt assembly of claim 14, wherein the belt strap is positioned further away from the body pad than the auxiliary D-piece.

21. The body belt assembly of claim 14, wherein the primary D-piece is positioned further away from the body pad than the belt strap.

22. The body belt assembly of claim 14, wherein the first and second primary D-rings are positioned closer to a center location on the body pad than the first and second secondary D-rings.

23. The body belt assembly of claim 14, wherein the first and second primary D-rings are larger than the first and second secondary D-rings.

24. The body belt assembly of claim 14, wherein the first and second primary D-rings are smaller than the first and second secondary D-rings.

25. The body belt assembly of claim 14, further comprising a buckle disposed proximate one of the proximate end and the distal end of the belt strap.

26. The body belt assembly of claim 25, further comprising holes for engaging the buckle disposed at an opposite one of the proximal end and the distal end from the buckle.

* * * * *